United States Patent [19]
England et al.

[11] Patent Number: 5,511,069
[45] Date of Patent: Apr. 23, 1996

[54] METHOD AND APPARATUS FOR CONTROLLING A COMMUNICATION DEVICE THROUGH A MODEM PROCESSOR

[75] Inventors: David G. England, Phoenix, Ariz.; Michael Eschmann, Folsom, Calif.; Cecil Moore, Queen Creek, Ariz.

[73] Assignee: Intel Corporation, Santa Clara, Calif.

[21] Appl. No.: 269,068

[22] Filed: Jun. 30, 1994

[51] Int. Cl.⁶ .............................. H04B 1/56; H04L 5/14
[52] U.S. Cl. .............................................. 370/24; 375/220
[58] Field of Search ............................ 370/24, 31, 85.1, 370/85.9, 85.11, 124, 26; 375/219, 220, 222; 455/73, 78, 79

[56] References Cited

U.S. PATENT DOCUMENTS

| | | | |
|---|---|---|---|
| 4,445,214 | 4/1984 | Reynolds et al. | 370/94.1 |
| 4,599,719 | 7/1986 | Breen et al. | 370/24 |
| 5,396,486 | 3/1995 | Scott | 370/31 |
| 5,404,351 | 4/1995 | Inoue | 370/24 |

*Primary Examiner*—Benedict V. Safourek
*Assistant Examiner*—Ajit Patel
*Attorney, Agent, or Firm*—Blakely, Sokoloff, Taylor & Zafman

[57] ABSTRACT

A method and apparatus for a processor of a computer system to control a communication device through a bus interface having six interconnects. The bus interface's first interconnect is a transmission and reception interconnect that allows the computer system to transmit and receive signals from a communication device (such as a telephone line or a radio transceiver). The second interconnect is a primary processor communication interconnect which serves as the primary communication route between the processor and a radio transceiver's microcontroller, and which enables the processor to control the various components of the radio transceiver. The third interconnect is a secondary processor communication interconnect that relays urgent signals (such as status, interrupt, and reset signals) between the processor and the radio transceiver's microcontroller. A received signal strength indicator interconnect is the fourth interconnect and it relays an analog signal specifying the strength of an incoming signal from the radio to the computer system. The fifth interconnect is a power supply link for supplying power signals to the radio transceiver. Finally, the sixth interconnect is a half-duplex control interconnect which allows the computer system to control the half-duplex nature of some radio transceivers.

10 Claims, 4 Drawing Sheets

METHOD AND APPARATUS FOR CONTROLLING A COMMUNICATION DEVICE THROUGH A MODEM PROCESSOR

BACKGROUND OF THE INVENTION

1. Field of the Invention

The present invention relates to the field of communications, and particularly to a method and apparatus for controlling a communication device through a processor of a computer system.

2. Art Background

A computer system often utilizes different communication devices based on the particular activity that it undertakes. For example, when a computer system needs E-mail capabilities, it typically uses a RAM Mobitex radio (which is a type of package switch E-mail system); whereas, when it needs voice capabilities, the computer system uses an AMPS radio (which is a type of cellular phone radio). Unfortunately, prior art interfaces between computer systems' processors (e.g., modem processors) and communication devices do not enable computer systems to utilize a variety of replaceable communication devices. In other words, prior art interfaces between computer systems' processors and communication devices limit the utility of the computer systems, because they do not render the computer systems' processors compatible with numerous replaceable communication devices. Therefore, a simple interface is needed to enable a computer system to be compatible with numerous replaceable communication devices.

SUMMARY OF THE INVENTION

The present invention provides a method and apparatus for controlling a communication device through a processor of a computer system. More specifically, the present invention is a bus interface that enables a processor of a computer system to control the transmission and reception of signals by a communication device. This bus interface has six interconnects. The first interconnect is a transmission and reception interconnect which allows the computer system to transmit and receive signals from one of a plurality of communication devices. For example, in one embodiment of the present invention, this interconnect includes a multiplexor which provides the computer system with the option of using either a telephone line or a radio transceiver as its communication device.

A primary processor communication interconnect is the second interconnect, and it serves as the primary route for communication between the processor and a microcontroller of the radio transceiver. More particularly, the primary processor communication interconnect enables the processor to control, via the microcontroller, the various components of the radio transceiver. The third interconnect is a secondary processor communication interconnect which is used for urgent communications between the processor and the radio transceiver's microcontroller. The radio transceiver's microcontroller and the processor use this secondary interconnect to send status, interrupt, and reset signals to each other.

Furthermore, the bus interface includes a received signal strength indicator interconnect. This interconnect is used by the radio transceiver to send an analog signal specifying the strength of an incoming received signal to the computer system. The bus interface also has a power supply link for supplying power signals to the radio transceiver. These power signals enable the processor and the microcontroller to be closely coupled, and thereby minimize transmission and reception errors due to noise spikes that are picked up on the radio transceiver's power supply lines. Finally, the bus interface has a half-duplex control interconnect, which allows the computer system to control the half-duplex nature of some radio transceivers.

BRIEF DESCRIPTION OF THE DRAWINGS

The objects, features, and advantages of the present invention will become apparent to one skilled in the art from reading the following detailed description in which.

DETAILED DESCRIPTION OF THE INVENTION

In the following description for purposes of explanation numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention with unnecessary detail. Furthermore, terms such as interconnects, bus lines, links, and pins are used interchangeably to refer to any connecting means (such as bus lines, pins, cables, wires, etc.) for transferring data between electrical components.

The present invention provides a method and apparatus for controlling a communication device through a processor of a computer system. More specifically, through a bus interface having a plurality of interconnects and through specific commands transmitted on these interconnects, the present invention allows a processor of a computer system to control the transmission and reception of signals by a communication device.

1. Bus Interface Having Six Sets of Interconnects

Figure 1:
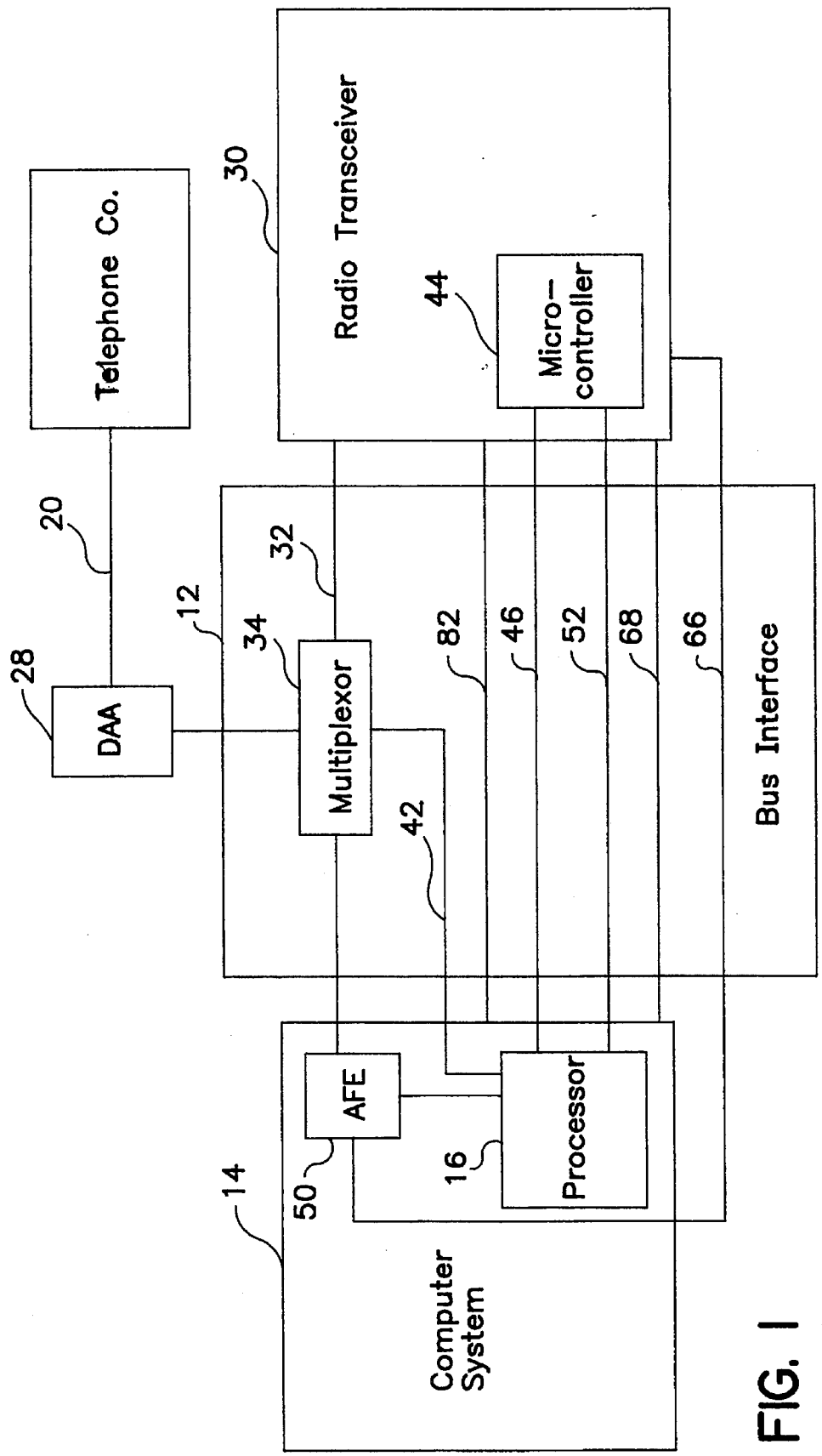
FIG. 1 presents a diagram of the present invention's bus interface, with six interconnects, coupling a computer system to two communication devices (a telephone line and a radio transceiver).

FIG. 1 presents one embodiment of the bus interface of the present invention. As shown in this figure, bus interface 12 allows computer system 14 to control the reception and transmission of data by either a wired communication device (i.e., telephone line 20) or a wireless communication device (i.e., radio transceiver 30). Bus interface 12 has six interconnects to accomplish this task. The first interconnect is transmission and reception interconnect 32, which (via its coupling to processor 16 through Analog Front End 50) allows the computer system to transmit and receive signals from one of two communication devices. This interconnect includes multiplexor 34 for providing the computer system with the option of using either telephone line 20 or radio transceiver 30 as its communication device. In other words, when the user of the computer system commands processor 16 to set RAE (radio enable) signal 42 to a low logic state, the computer system transmits and receives information via telephone line 20; whereas, when the user commands processor 16 to set the RAE signal to a high logic state, the computer system utilizes radio transceiver 30.

Primary processor communication interconnect 46 is the second interconnect of bus interface 12, and it serves as the primary communication route between processor 16 and the radio transceiver's microcontroller 44. More particularly, primary processor communication interconnect 46 enables processor 16 to control, via microcontroller 44, the various components of radio transceiver 30. In one embodiment of this invention, primary communication link 46 is an asynchronous serial communication link. The third interconnect of bus interface 12 is secondary processor communication interconnect 52, which is used for urgent communications between processor 16 and microcontroller 44. The processor and the microcontroller use this secondary link to relay status, interrupt, and reset signals to each other.

Furthermore, bus interface 12 includes received signal strength indicator link 66. Radio transceiver 30 uses this interconnect to send an analog signal specifying the strength of the incoming received signal to computer system 14. Bus interface 12 also has power supply link 68, and this link supplies power supply signals from computer system 14 to radio transceiver 30. These power supply signals enable the processor and the radio transceiver's microcontroller to be closely coupled, and thereby minimize transmission and reception errors due to noise spikes that are picked up on the radio transceiver's power supply lines. Finally, bus interface 12 includes half-duplex control interconnect 82 for allowing computer system 14 to control the half-duplex nature of some radio transceivers.

2. Bus Interface Having Fourteen Lines

Figure 2:
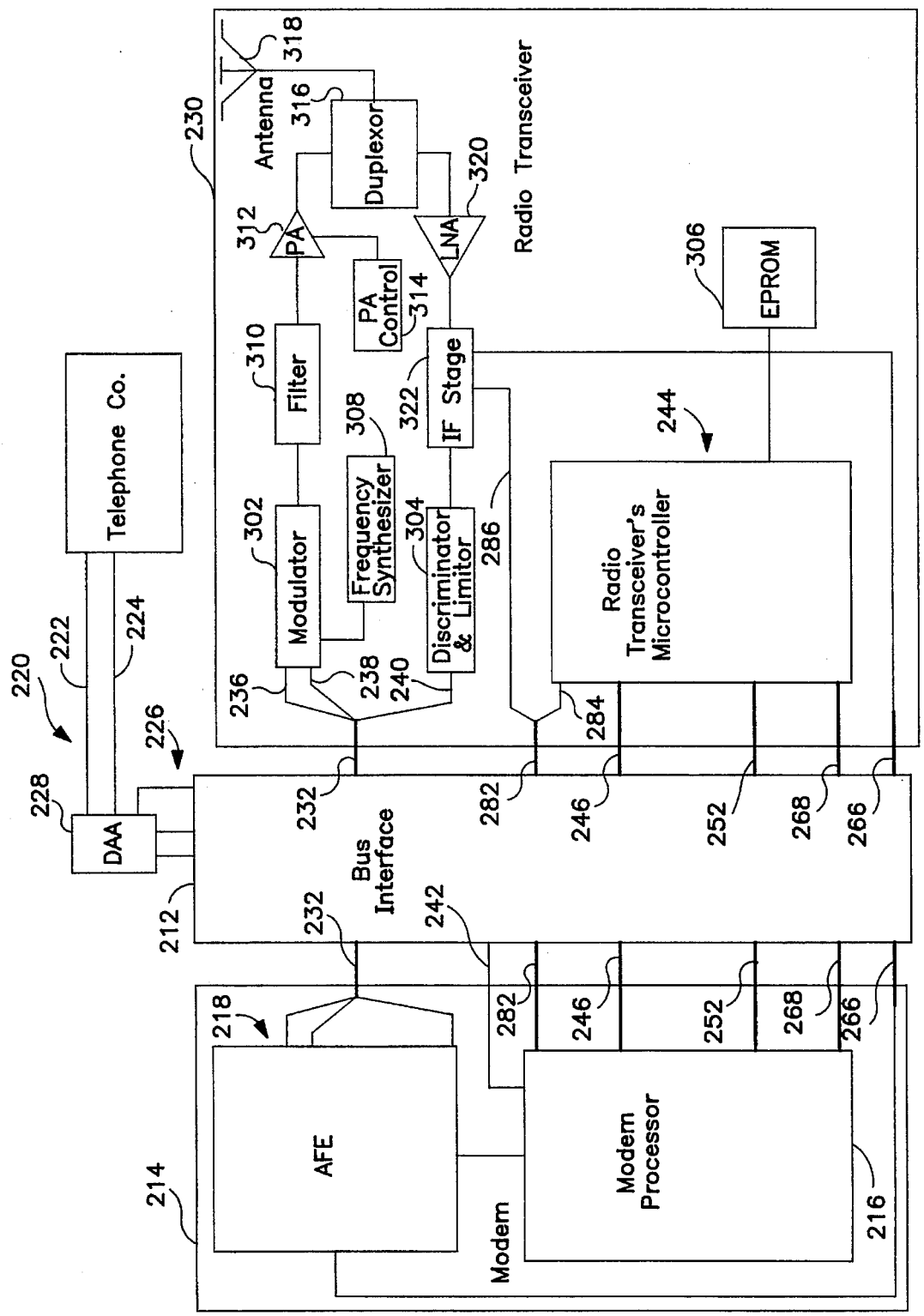
FIG. 2 presents a diagram of the present invention's bus interface, with fourteen bus lines, coupling a modem to two communication devices (a telephone line and a radio transceiver).
Figure 3:
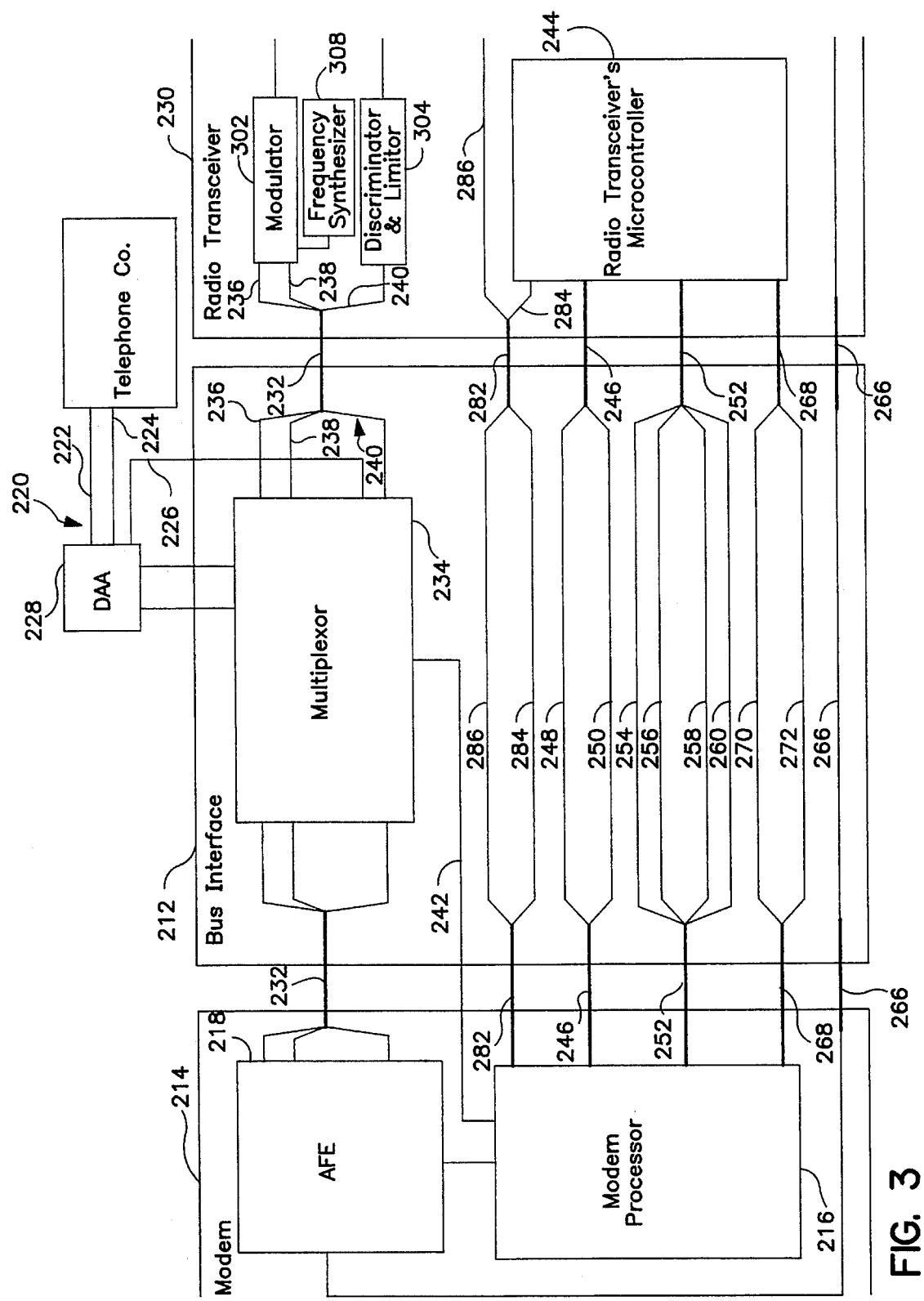
FIG. 3 presents an enlarged view of the bus interface of FIG. 2.

FIGS. 2 and 3 present another embodiment of the bus interface of the present invention. It should be noted that, in order to provide a thorough understanding of the present invention, FIGS. 2 and 3 set forth bus interface 212, which couples a modem (and a modem processor) to a radio transceiver and a telephone line. However, it will be apparent to one skilled in the art that the bus interface of the present invention can be used to couple any computer system (with any type of processor) to any one of a plurality of communication devices.

As seen from FIGS. 2 and 3, bus interface 212 has the following six interconnects: (1) transmitting and receiving signal link 232, (2) primary processor communication link 246, (3) secondary processor communication link 252, (4) received signal strength indicator link 266, (5) half-duplex control link 282, and (6) power supply link 268.

a. Transmitting and receiving signal link

Transmitting and receiving signal link 232 allows modem 214 to transmit and receive signals from one of two communication devices (i.e., telephone line 220 or radio transceiver 230). This link is coupled to modem processor 216 through the modem's Analog Front End (AFE) 218, which converts the digital signals supplied by the modem processor to the communication devices into analog signals and converts the analog signals supplied by the communication devices to the modem processor into digital signals.

Since radio transceiver 230 uses the same interface from an analog point of view as telephone line 220, the modem does not need to differentiate the radio transceiver from the telephone line. Consequently, transmitting and receiving signal interconnect 232, which includes multiplexor 234, can provide the modem with the option of using either telephone line 220 or radio transceiver 230 as its communication device. For example, when a user commands (via a bus that is not shown in FIGS. 2 and 3) the modem processor to set RAE (radio enable) signal 242 to a low logic state, the modem uses DAA (Data Access Arrangement) 228 (1) to transmit information via ring line 222 and tip line 224, and (2) to receive information via RX_D line 226.

On the other hand, when a user commands the modem processor to set the RAE signal to a high logic state, the modem utilizes radio transceiver 230. More specifically, when modem processor 216 chooses radio transceiver 230 as its communication device (by placing a "1" on the RAE line), modulator 302 receives analog transmission signals from AFE 218 via transmit (TXa_R and TXb_R) bus lines 236 and 238, while discriminator and limitor 304 supplies analog reception signal to AFE 218 via reception (RX_R) bus line 240. The transmission signals that modem processor 216 (through AFE 218) places on the TXa_R and TXb_R bus lines, are chosen to be two fully differential baseband signals, in order to filter out the common mode and to improve signal to noise ratio.

In addition, in order to modulate these differential baseband transmission signals, modem processor 216 needs to supply modulator 302 with the appropriate channel frequency and signal level. Initially, when the radio is coupled to bus interface 212, the particular parameters of the radio module (on which the signal levels of the transmission signals are dependent on) have to be downloaded from EEPROM 306 to modem processor 216 via primary processor communication link 246. Modem processor 216 then uses primary processor communication link 246 to inform microcontroller 244 of the appropriate transmitting channel frequency and required signal level. In turn, microcontroller 244 communicates the channel frequency and signal level to modulator 302 via frequency synthesizer 308, which is commonly coupled to the microcontroller by an $I^2C$ bus interface (not shown in FIGS. 2 and 3) that couples all of the components of radio transceiver 230 to microcontroller 244. The required frequency deviation typically results in the requirement that the amplitude of the modulating signal be controlled within 5% for a given frequency deviation. This error is split at production between the calibration of the radio (2.5%) and the processor module (2.5%); both these errors include process, temperature, and supply voltage effects.

After modulation, the information for transmission is supplied to filter 310 for filtering out out-of-transmission-band components of the transmission signal. Power amplifier 312 then receives the transmission signal from filter 310, in order to amplify the low level transmission signal up to the output power level. The specific output power level is determined by the modem processor 216, which via primary communication link 246 informs microcontroller 244 of the desired output power level; in turn, through the $I^2C$ bus arrangement, microcontroller 244 causes power amplifier controller 314 to select the appropriate output power level. Duplexor 316 then transmits via antenna 318 the output transmission signal that the power amplifier supplies to it.

Duplexor 316 is also coupled to antenna 318 to direct the received signals, which are typically around 900 MHz, to the receiver section of radio transceiver 230. The received signal is first supplied to low noise amplifier 320 for amplification. In several sequential steps, the carrier frequency of the amplified received signal is then removed in order to facilitate the decoding of the information. For instance, low noise amplifier 320 supplies the amplified received signal to intermediate frequency stage 322, which lowers the high carrier frequency of the received signal to an intermediate frequency range. Typical, intermediate frequency stage 322 has a first stage that carries the 900 MHz signal down to 45 MHz, and a second stage that carries the carrier frequency down to 450 KHz. Finally, the carrier frequency of the received signal is reduced to a baseband frequency (i.e., a frequency from DC to 10 KHz) by discriminator and limitor 304, which also performs the appropriate demodulation of the received signal. After the removal of the carrier frequency and the demodulation of the received signal, a baseband analog radio received signal is obtained, which is supplied via receive signal (RX_R) bus line 240 to the A/D converter of AFE 218. The modem's AFE should provide a programmable gain of up to 22.5dB for the received signal to offset variations in signal level.

b. Primary processor communication link

As shown in FIGS. 2 and 3, bus interface 212 also includes primary processor communication link 246, which serves as the primary communication route between modem processor 216 and microcontroller 244. More specifically, primary processor communication link 246 enables modem processor 216 to control, via microcontroller 244, the various components of radio transceiver 230. In the embodiment of the present invention that is set forth in FIGS. 2 and 3, primary processor communication link 246 is a full-duplex asynchronous serial port that runs at 9600 bps or faster, with eight data bits, one stop bit, and no parity bit (8-1-N data configuration). In addition, primary processor communication link 246 has (1) radio receive (RRX) bus line 248, which allows modem processor 216 to send digital signals to microcontroller 244, and (2) radio transmit (RTX) bus line 250, which allows microcontroller 244 to send digital signals to modem processor 216.

Transactions over primary processor communication link 246 are controlled through data requests by either the modem or the radio module (such as an LCD/Keypad, an AMPS radio, or a RAM Mobitex radio). For instance, when the modem does not request the radio module to transmit data, the radio module will tristate the signal on the RTX line. Once the modem processor decides to send a command to the microcontroller of the radio module, it places a start bit on the RRX line (i.e., it pulls the signal on the RRX line low). The modem processor then uses the following command structure:

[CMD] [n-byte data field] [DLE] [ETX]

It should be noted that the brackets ("[" and "]") are not actually used in the physical bus interface, but rather only are shown here as data separators. Furthermore, [CMD] is an address specific command byte, which allows modem processor 216 to use efficiently serial port 246 to communicate simultaneously with the microcontrollers of several radio modules (such as the controllers of an LCD/Keypad, an AMPS radio, or a RAM Mobitex radio). More specifically, the command protocol used in the present invention involves modem processor 216 (1) placing an address specific command on RRX line 248, and (2) waiting for a response on RTX line 250 from the addressed microcontroller, which is the only controller coupled to serial port 246 that can interpret the command (e.g. an AMPS radio will not respond to requests for a keyscan code, because the code request command could only be deciphered by the controller of the LCD/Keypad).

For one embodiment of the present invention, the upper nibble (i.e., the upper four bits) of command byte [CMD] is the address. Table 1 sets forth three command ranges for three particular radio modules, and reserves the other thirteen command ranges for other radio modules.

TABLE 1

| Command Range | Module |
|---|---|
| '00–'0F | AMPS Radio |
| '10–'1F | Mobitex Radio |
| * | * |
| * | * |
| * | * |
| 'F0–'FF | LCD/Keypad I/F |

As it can be seen from Table 1, because the upper nibble of the command byte is the address, each radio module is allowed only sixteen commands. Modules that need more than sixteen commands must use a command plus data field structure. As mentioned before, because each module has its own separate commands, multiple radio modules can be coupled simultaneously to the modem processor via serial port 246, in order to maximize the efficiency of this serial port. One set of commands, relating to AMPS radios, will be set forth below in Tables 2–4.

The address specific command byte [CMD] (as well as every other byte transmitted on the primary processor communication link) is terminated by a stop bit (i.e., after each command byte, the signal on the RRX line is pulled high). This stop bit is then followed by a variable number of data bytes [n-byte data field], which are used (1) to increase the number of commands available to a particular radio module, and/or (2) to supply the relevant data to the microcontroller for implementing the modem processor's command.

In order to synchronize the modem processor and the microcontroller, the end of the command stream is delineated by terminating each command frame with two fixed value bytes, the [DLE] and [ETX] bytes. The [DLE] byte is a delimiter byte with a value of 1OH (i.e., a value of 00010000), while the [ETX] byte signifies the end of transmission and has a value 03H (i.e., a value of 00000011). To differentiate the [DLE] byte from data bytes that happens to have the same value, it must be repeated. For example, the following command:

[00] [34] [10] [04] [10] [F8] [10] [03]

is sent to the microcontroller as:

[00] [34] [10] [10] [04] [F8] [10] [03]

Consequently, on the microcontroller side, any [DLE] character received are removed along with the next character in the stream. When the data removed are two successive [DLE] characters, the two will be replaced by a single [DLE] byte. On the other hand, the reception of [DLE] and [ETX] is seen as a stream terminator, while the reception of a [DLE] byte along with any other data byte (i.e., any byte that is not [ETX] or [DLE] byte) is ignored.

In order to make the present invention compatible with micro-controller's that only use on-board FIFO RAM (i.e., do not use external RAMs), modem processor 216 waits for a response to a first command, before placing a second command stream on the RRX line. Therefore, the command protocol of the present invention requires the addressed module to respond to all commands on the RTX line. Commands that do not require the addressed module to send back data are responded to with a single acknowledge byte [ACK], which has a value of 06H for all radio modules. However, for commands that do require the addressed module to send back data, the [ACK] byte is not returned; instead, the addressed module sends the requested data packet responses (via the RTX line) in a format which is similar to the format of the modem processor's command:

[RES] [n-byte data field] [DLE] [ETX]

Response byte [RES] is a response flag that identifies the type of data being sent back. In most cases the value of the response byte [RES] will be identical to the command byte [CMD] to which it is responding. However, response byte [RES] cannot include the [ACK] octet of 06H.

As mentioned before, the modem processor will wait for a response before issuing another command. If for some reason the microcontroller of the radio module receives a command without receiving the required n bytes of data, or the microcontroller needs the command to be resent, it will respond with a command not acknowledged byte [NACK] (which has the value 15H). In addition, if no response is returned within a specified period of time, the modem processor will reset the offending microcontroller.

For one embodiment of the present invention, Table 2–4 sets forth a suggested list of command and response streams that allow a modem processor to communicate with an AMPS radio. More specifically, for an AMPS radio, Table 2 sets forth a suggested list of command bytes [CMD] with their accompanying n-byte data fields; in the interest of brevity, the [DLE] and [ETX] bytes that terminate each command stream are not recited. Also, as shown in Table 1, because the command is addressed to an AMPS radio, the upper nibbles of command bytes [CMD] are 0.

TABLE 2

| Command Type | Command Byte | Allowed N-Byte Data Fields |
| --- | --- | --- |
| Set synthesizer's transmit channel | [01] | 2 byte field for selecting a channel from channel 0 to channel 834 |
| Set synthesizer's receive channel | [02] | 2-byte field for selecting a channel from channel 0 to channel 834 |
| Set power level for transmission | [03] | 1 byte field, which for a class III AMPS radio equals [00] to indicate −2dBw [01] to indicate −2dBw [02] to indicate −2dBw [03] to indicate −6dBw [04] to indicate 10bdBw [05] to indicate −14dBw [06] to indicate −18dBw [07] to indicate −22dBw |
| Transmitter enable or disable | [04] | 1 byte field which is [00] when transmitter is disabled [01] when transmitter is enabled. |
| AMPS radio power enable or disable | [05] | 1 byte field which is [00] when AMPS radio is off, and [01] when AMPS radio is on. |
| AMPS radio's microcontroller reset | [06] | 1 byte field which is [00] for not executing POST, and [01] for executing POST. |
| AMPS radio fixed configuration read | [07] | no field |
| AMPS radio's synthesizer LOCK read | [08] | 1 byte field which is [00] when receive LOCK read, and [01] when transmit LOCK read |
| Transmit status request | [09] | no field |
| Write data to EEPROM | [0D] | 2 byte filed, where the first |

TABLE 2-continued

| Command Type | Command Byte | Allowed N-Byte Data Fields |
| --- | --- | --- |
| for microcontroller configure | | byte is the [location] which can be any value from 0 to 255, and the second byte is the [data] which can be any value from 0 to 255. |
| Microcontroller full power-down | [0E] | no field |
| Test-Mode set transmit power level | [0F] | 1 byte where power level can have any value from 0 to 255. |

Table 3 sets forth a suggested list of response bytes [RES] with their accompanying n-byte data fields. Again, the [DLE] and [ETX] bytes that terminate each response stream are not recited, and the upper nibbles of the response bytes are 0 to indicate that the responses are from an AMPS radio.

TABLE 3

| Response Type | Response Byte | Allowed N-Byte Fields |
| --- | --- | --- |
| AMPS radio's microcontroller POST results | [01] | 1 byte field which is [00] if failed, [01] if passed, and all other fields reserved for specific results |
| Transmit LOCK indicator | [02] | 1 byte field which is [00] if NOT LOCKED, and [01] if LOCKED. |
| Receive LOCK indicator | [03] | 1 byte field which is [00] if NOT LOCKED, and [01] of LOCKED. |
| AMPS radio's microcontroller serial number | [04] | 4 byte field sent in binary with the LSB being the first bit of the first byte |
| AMPS radio's microcontroller station class mark | [05] | 1 byte field, where bits 0 and 1 indicate the power class, bit 2 indicates transmission, bit 3 indicates bandwidth |
| AMPS radio's microcontroller type | [07] | 1 byte field which is [00] when use an AMPS radio microcontroller, and [01] when use a Mobitex radio microcontroller. All other fields are reserved for specific types |
| AMPS radio's microcontroller output modulation deviation factors | [08] | 20 byte fields |
| AMPS radio's DEMODULATOR | [09] | 1 bye field. |

Table 4 sets forth a number of possible communication sequences that can occur with the suggested list of command and response bytes and the accompanying n-byte data fields that are set forth in Tables 2 and 3. In several instances, an "x" is used to indicate that a specific value of the data field is not required.

TABLE 4

| AMPS Action | Command | Response | Microcontroller Action |
| --- | --- | --- | --- |
| Power-up microcontroller | [05] [01] [10] [03] | [06] | Acknowledge |

TABLE 4-continued

| AMPS Action | Command | Response | Microcontroller Action |
|---|---|---|---|
| Microcontroller reset | [00] [00] [10] [03] | [06] | Acknowledge |
| Microcontroller reset plus POST | [06] [01] [10] [03] | [01] [01] [10] [03] | post passed |
| Microcontroller configuration read | [07] [10] [03] | [07] [00] [10] [03] | AMPS microcontroller |
| | | [04] [xx] [xx] [xx] [xx] [10] [03] | Serial number value |
| | | [05] [0A] [10] [03] | SCM = class III, cont. transmit, 25Mhz BW. |
| | | [08] [xx] [xx] ... [xx] [xx] [10] [03] | 20 output Mod Factors |
| | | [09] [xx] [10] [03] | 1 Demod Cal Factor |
| Set transmit channel 334 (decimal) | [01] [4F] [01] [10] [03] | [06] | Acknowledge |
| Set receive channel 334 (decimal) | [02] [4F] [01] [10] [03] | [06] | Acknowledge |
| Request receive LOCK indicate | [08] [00] [10] [03] | wait for lock ... ... receive lock ... [03] [01] [10] [03] | LOCK Achieved |
| Set power level to MAX output | [03] [00] [10] [03] | [06] | Acknowledge |
| Set power level to MAX output | [03] [00] [10] [03] | [06] | |
| Enable transmit | [04] [01] [10] [03] | [06] | Acknowledge |
| Request transmit LOCK indicate | [08] [01] [10] [03] | wait for lock ... ... receive SYNTH lock ... [02] [01] [10] [03] | LOCK Achieved |
| Write EEPROM data "U" to microcontroller at location "5" | [0D] [05] [55] [10] [03] | [06] | Acknowledge |
| Set transmit level ... For test only! | [0F] [FF] [10] [03] | [06] | Acknowledge |
| Total power-down of microcontroller reset recruired | [0E] [10] [03] | [06] | Acknowledge | c. Secondary processor communication link

Bus interface 212 also has secondary processor communication link 252 for relaying urgent commands between the modem processor and the microcontroller of the radio module. This secondary communication link has: (1) transmit disable (TXDIS#) line 254; (2) transmit ready (TXREADY) line 256; (3) reset (RESET) line 258; and (4) radio interrupt (RINT) line 260.

TXDIS# bus line 254 allows both modem processor 216 and microcontroller 244 to quickly disable a transmission or a reception by switching off the radio transceiver's power supply. On occasions, either the microcontroller or the modem processor detects a condition that is not allowed by the FCC, such as the radio transceiver's transmission of signals on a prohibited frequency during a frequency transition. The processors can quickly rectify such undesired conditions by pulling the signal on the TXDIS# line low, which in turn switches off the power to the transceiver.

Transmit ready (TXREADY) bus line 256 is used by the radio transceiver's microcontroller to quickly inform the modem processor that the radio transceiver is ready to receive transmission signals. In order to prevent an inadvertent transmission when the radio is not stabilized, the microcontroller pulls the signal on the TXREADY line low, when the channel or the power level is being changed. In turn, when the transmit synthesizer has reached lock and the power amplifier has ramped up to it's output level, the microcontroller pulls the signal on the TXREADY line high. TXREADY bus line, not only is used to quickly inform the modem processor that the transceiver is ready to receive transmission signals, but also is used to satisfy radio transmission specifications which require relatively accurate timing of turn on and off operations of the transmitter.

RESET line 258 is a hardware reset line, which is used to reset the microcontroller to a known state. The signal on the RESET line is active (i.e., it is at a high logic level) at power up of the modem processor system for a period of at least 20 mS after the signal on the DVCC line (which is discussed below) is within specifications. In addition, when microcontroller 244 does not respond to modem processor 216, the modem processor quickly resets the microcontroller to a known state by using the RESET line.

Radio interrupt (RINT) line 260 is used by radio transceiver 230 to send an interrupt signal to modem processor 216, in order to quickly gain the attention of the modem processor. For example, whenever the radio wants to send an unsolicited message on primary processor communication port 246, microcontroller 244 sets the signal on the RINT line high. The modem processor responds to this interrupt by sending an appropriate command to the radio, to which the radio will then respond. Furthermore, the radio must keep this signal active until the modem processor has acknowledged receipt of the interrupt with a "status request message".

The radio transceiver also uses the RINT line as a rapid means for interrupting the modem processor's transmission of data. For example, if the microcontroller suddenly finds the frequency synthesizer to be out of lock in the middle of a transmission, the microcontroller sends an interrupt signal to the modem processor by pulling the signal on RINT line high. In order to discover the reason for the interruption, the modem processor then stops its transmission and begins communicating with the microcontroller via primary processor communication line 246.

d. Received signal strength indicator link

As shown in FIGS. 2 and 3, bus interface 212 also includes received signal strength indicator (RSSI) link 266. This bus line carries an analog signal from intermediate frequency stage 322 to AFE 218 of modem 214. This analog signal specifies the strength of the incoming received signal, which is measured by detection circuitry in the intermediate frequency stage. In an alternative embodiment of radio transceiver 230, the received signal strength indicator signal is measured by detection circuitry in duplexor 316 or discriminator 304. Consequently, for these alternative embodiments, the RSSI link couples AFE 218 to either duplexor 316 or discriminator 304.

During idle time (i.e. time that the radio transceiver neither transmits nor receives data), the modem uses the strength of the received signal to maintain the strength and accuracy of the received signal, by occasionally changing the receiving channel as the receiving signal weakens. In other words, because a radio signal is transmitted on different frequencies for different cells (i.e., geographical areas), a modem processor during idle time occasionally switches the frequency of the radio transceiver's receiving channel (i.e., needs to undertake a "handover" operation), as it moves from one cell to another.

In addition, initially when the radio transceiver and the modem are coupled together by bus interface 212, the modem uses the RSSI link to select the strongest receiving channel. Furthermore, during non-idle time (i.e. time that the radio transceiver is either transmitting or receiving data), the modem uses the strength of the received signal to prepare it for a foreseeable "handover" operation initiated by the base station. Finally, it should be noted that the RSSI link would not be utilized if a radio transceiver had converted the analog received signal strength voltage into a digital signal, and had supplied this digital signal to the modem processor through the primary processor communication link.

e. Half-duplex link

Bus interface 212 also includes half-duplex control interconnect 282 for allowing modem 214 to control the half-duplex nature of some radio transceivers. As shown in FIGS. 2 and 3, this half-duplex control link includes the following two bus lines: transmit/receive (TX_RX#) line 284 and radio clock signal (RCLK) line 286.

TX RX_# line 284 is used by modem processor 216 for half-duplex radio transceivers (i.e., radio transceivers, such as Ram Mobitex radios, that are not capable of transmitting and receiving signals simultaneously, but rather are only capable of transmitting or receiving at any one time). More specifically, modem processor 216, via TX_RX# line 284, instructs a half-duplex radio transceiver to be either in a transmit mode (by pulling the signal on the TX_RX# line high) or receive mode (by pulling the signal on the TX_RX# line low). The modem processor uses the TX_RX# line, rather than the primary processor communication link, to control the operation of the half-duplexor, because it would be difficult to accurately time the switching between the transmit and receive modes with the asynchronous and slow primary processor communication link.

In addition, for the modem processor to accurately switch between the receive and transmit modes, the modem processor has to receive the clock signal RCLK that half-duplex radio transceivers produce. In other words, in any given cell, a plurality of radio transceivers and base stations transmit at the same frequency but at different time slots. Consequently, a radio transceiver and a base station, not only have to transmit at the same frequency, but also have to transmit at the identical phase margin in order to communicate with each other; otherwise, their signals will clash with signals from other radio transceivers and base stations that transmit on the same frequency. Therefore, by receiving the radio generated clock signal on RCLK bus line 286, modem processor 216 can accurately switch between the receive and transmit modes in order to maintain the necessary time synchronization between the radio transceiver and the base station.

Because the carrier signal of the received signal is always very accurate, the radio transceiver typically derives the low frequency RCLK from the carrier signal. More specifically, RCLK is generated by the intermediate frequency stage 322 (1) extracting the carrier signal from the received signal, (2) amplifying the carrier signal while limiting the amplitude of this signal, and thereby obtaining a high frequency clock signal, and (3) reducing the frequency of this clock signal to about 15 Hz. For example, in the RAM Mobitex radio, after the amplification and limitation of the carrier wave, a high frequency clock with a frequency of 14.85 MHz is obtained; a twenty stage divider then reduces the frequency of the clock signal to 14.16 Hz. In this manner, the radio generates a highly accurate low frequency RCLK, that can be used in the accurate timing of data transmissions and receptions. The signal is used to enable a timer on the modem processor. This timer measures the width of the clock pulse in terms of the system clock. From this an error in the system clock frequency can be calculated and suitable adjustments can be made.

f. Power supply link

Finally, bus interface 212 includes power supply link 268 for supplying power signals to radio transceiver 230. Power supply link 268 has digital Vcc (DVCC) bus line 270 and digital ground (DGND) bus line 272, which provide the digital Vcc and ground voltages of modem processor 216 to microcontroller 244. In turn, these supply voltages run the radio's digital logic (e.g. the microcontroller).

In addition, by providing the modem's power supply signals to the radio transceiver's microcontroller, the modem processor and the microcontroller are closely coupled. This close coupling in turn minimizes transmission and reception errors due to noise spikes that are picked up on the radio's power supply lines. More particularly, when the interfaces between the digital and analog portions of the radio transceiver are not adequately isolated, the digital portions inject noise into the analog portions, which might in turn lead to a violation of the FCC requirements if the noise is a particular subharmonic of the carrier frequency. Therefore, by providing the modem's power supply signals to the microcontroller, transmission and reception errors due to noise are reduced.

3. Bus Interface Having Sixty One Lines

Figure 4:
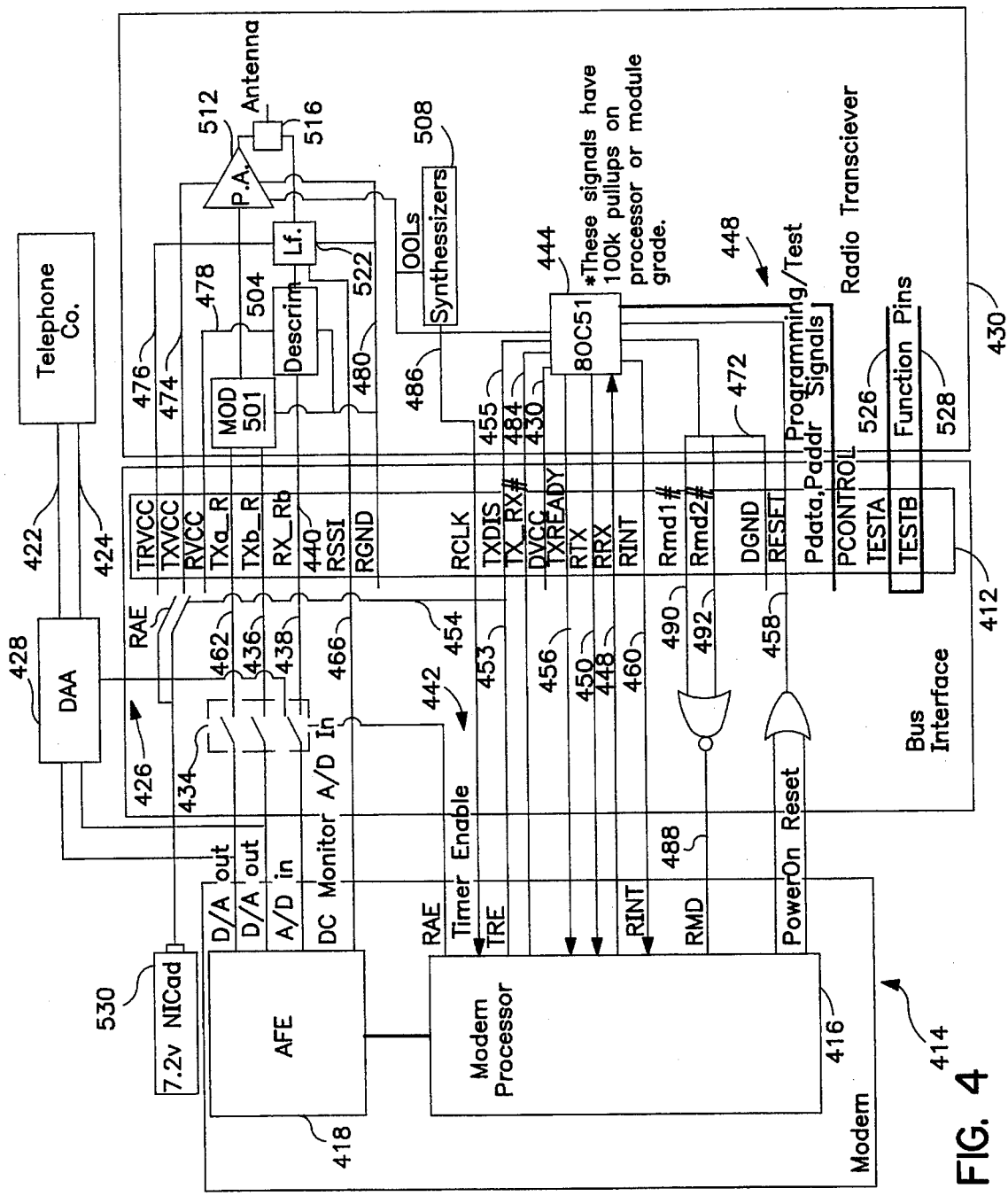
FIG. 4 presents a diagram of the present invention's bus interface, with sixty one bus lines, coupling a modem to two communication devices (a telephone line and a radio transceiver).

FIG. 4 presents another embodiment of the bus interface of the present invention. Bus interface 412 has sixty one connectors, which can be classified into the following nine sets of links: (1) the transmitting and receiving signal link; (2) the primary processor communication link; (3) the secondary processor communication link; (4) the received signal strength indicator link; (5) the half-duplex control link; (6) the power supply link; (7) the radio insertion link; (8) the programming link; and (9) the test link.

a. Transmitting and receiving signal link

The discussion with respect to the transmitting and receiving signal link 232 of FIGS. 2 and 3 applies in its entirety to the transmitting and receiving signal link of FIG. 4 (comprising multiplexor 434, TXa_R line 436, TXb_R line 438, RX_R link 440, and RX_D line 426). Consequently, this discussion is not repeated here in order not to obscure the present invention with unnecessary detail.

b. Primary processor communication link

The discussion with respect to primary processor communication link 246 of FIGS. 2 and 3 applies in its entirety to the primary processor communication link of FIG. 4 (comprising RRX line 448 and RTX line 450). Consequently, this discussion is not repeated here in order not to obscure the present invention with unnecessary detail.

c. Secondary processor communication link

The discussion with respect to secondary processor communication link 252 of FIGS. 2 and 3 applies in its entirety to the secondary processor communication link of FIG. 4 (comprising TXDIS# line 454, TXREADY line 456, RESET line 458, and RINT line 460). However, FIG. 4 sets forth one additional feature of the secondary processor communication link of bus interface 412. This feature is the manner by which the TXDIS# signal disables the radio transceiver. As shown in FIG. 4, TXDIS# line 454 has two transmit disable links, TXDIS#1 line 453 and TXDIS#2 line 455, which are wire-OR'ed together and which carry open drain signals (i.e., the processors only pull down these signals). Thus, if the signal on either of these transmit disable lines is pulled low (signal on the TXDIS#1 line is pulled low by modem processor 416, while signal on the TXDIS#2 line is pulled low by microcontroller 444), switch 462 is opened, which in turn quickly disables power amplifier 512 by switching off it's power supply.

TXDIS#1 signal is used for radio protocols that require a fail-safe mechanism for disabling the power amplifier. Under normal operations, the radio microcontroller will switch off the power to the power amplifier whenever required (such as when frequency synthesizer 508 is out of lock) by pulling the signal on TXDIS#2 low. However, if a fault occurs and the transmit power amplifier does not turn off for some reason (e.g. 'stuck at' fault), then the modem processor can turn off the power by pulling the signal on TXDIS#1 line low.

d. Received signal strength indicator link

The discussion with respect to received signal strength indicator link 266 of FIGS. 2 and 3 applies in its entirety to received signal strength indicator link 466 of FIG. 4. Consequently, this discussion is not repeated here in order not to obscure the present invention with unnecessary detail.

e. Half-duplex link

The discussion with respect to half-duplex link 282 of FIGS. 2 and 3 applies in its entirety to the half-duplex link of FIG. 4 (comprising TX_RX# link 484 and RCLK link 486). Consequently, this discussion is not repeated here in order not to obscure the present invention with unnecessary detail.

f. Power supply link

The discussion pertaining to DVCC bus line 270 and DGND bus line 272 of FIGS. 2 and 3 applies in its entirety to DVCC bus line 470 and DGND bus line 472 of FIG. 4. In addition, the power supply link of bus interface 412 of FIG. 4 has four additional power lines, which are: TXVCC line 474, TRVCC line 476, RVCC line 478, and RGND line 480. TXVCC line 474 couples power amplifier 512 to a battery pack supply via solid state switch 462, which is controlled by TXDIS line 454. TRVCC line 476 is also coupled to the 7.2V battery supply (via solid state switch 464 that is controlled by RAE line 442), and it supplies this power to intermediate frequency stage 522 when the radio is active (i.e., RAE signal is pulled high which in turn closes switch 464).

RVCC line 478 supplies a relatively noise free analog 5V power signal to modulator 502 and discriminator 504 of radio transceiver 430. The operation of RVCC line 478 is also controlled by port pin RAE of the modem processor. Finally, NiCad battery 530 supplies the main analog ground supply voltage on RGND line 480, which acts as a separate ground return path for all of the radio transceiver's analog power supplies signals (e.g. the power signals supplied by TRVCC, TXVCC, and RVCC). This ground link is coupled to the main chassis ground of the modem, which serves as the ground plane of the whole system (i.e., all other grounds are connected to it); in other words, the return current path of the transceiver power supplies is the radio casing connected to the main chassis ground of the modem.

g. Radio insertion link

Bus interface 412 of FIG. 4 also has radio insertion link 488 for detecting when a plug-in radio module is correctly coupled to the modem. Radio insertion link 488 has two radio module detect links, RMD#1 link 490 and RMD#2 link 494. These two RMD links are grounded (i.e., tied to digital ground) on the radio side of the bus interface. However, on the modem side of the interface, these two links are coupled to pull-up resistors (not shown in FIG. 4) and are then NOR'ed together to produce the radio module detect signal (RMD) that is supplied to the modem processor.

Furthermore, RMD#1 link 490 and RMD#2 link 494 should be at opposite ends of the radio module connector in order to assure that the radio module is correctly inserted at both ends. Once the radio module is inserted correctly at both ends, the signals on both RMD#1 line 490 and RMD#2 line 494 are pulled to ground, which in turn causes a "1" to be supplied to the modem processor. The modem processor then initiates communications with the radio transceiver's microcontroller by sending a command to the microcontroller on the RRX line; the command requires the radio module to identify itself. In addition, the RMD signal is also used by the modem processor to check whether the radio module has been detached from the modem. More specifically, since the radio transceiver does not generate any interrupt signals to the modem processor as the radio transceiver is being detached from the connector, the modem firmware must periodically check the status of the signal on the RMD line. If for any reason the radio module is detached from the bus interface, the RMD signal immediately will go low and thus will let the modem processor know that it has to stop communicating with the radio transceiver.

h. Programming link

Radio transceivers contain either an EPROM or an EEPROM that provides the transceiver's microcontroller with its program and its parameters. Both the EPROM and the EEPROM must be programmed through the bus interface at the point of sale (i.e. when the radio module is being sold). Typically, the data to be programmed are such things as access numbers. For a microcontroller with an EPROM, the control lines for programming are usually multiplexed with other functions used in normal operation. In addition, in order to isolate these other functions, a number of pins in the interface are used to break the connection between the microcontroller and the controlled circuitry. These pins are then used for programing and testing when the radio is plugged into a special programming station that does not short these signals. However, when the radio transceiver is coupled by the bus interface to the modem processor unit, these pins are not used, but rather are shorted to one another on the processor side of the interface.

Bus interface 412 is compatible to both radios that use serial EPROMs or EEPROMs (i.e., EPROMs or EEPROMs that are serially connected to the microcontroller) and radios that use parallel EPROMs or EEPROMs (i.e., EPROMs or EEPROMs that are parallel connected to the microcontroller). For radio transceivers having a serial EPROM or EEPROM devices, these devices can be programmed through the transceiver's microcontroller via the asynchronous primary processor communication link. Care must be taken that the EPROM or EEPROM contents are not normally accessible through the serial port by the end user. Thus, a program enable (PSEN#) pin is provided at the interface and this pin is not accessible to the modem processor.

On the other hand, for radio transceivers having a parallel EPROM or EEPROM, bus interface 412 has programming interface 498, which includes a program data bus, a program address bus, and a program control bus. None of these buses are accessible from the modem processor side of the interface (i.e., they have no interconnects on the modem side). The program data (PDATA) bus has eight bus lines which are used for parallel carrying of data to parallel programming radios. These eight bus lines are not used by the programmer in the case of serial programming. Program address (PADDR) bus has twelve bus lines which carry the address of the data to be programmed. These twelve address bus lines allow the programming of up to 4K bytes of EPROM or EEPROM space. Program control bus is used to parallel program a typical microcontroller, and has the following pins: PSEN#, PROG#, Vpp, LOCK, PRD#, CTL0, CTL1, CTL2. Table 5 shows how these control pins are used to parallel program a typical parallel EPROM or EEPROM (such as the EEPROM of the 80C51 microcontroller):

TABLE 5

| Mode | PSEN# | PROG# | Vpp | LOCK | PRD# | CTL0 | CTL1 | CTL2 |
|---|---|---|---|---|---|---|---|---|
| 1 Program Code Data | 0 | Pulse ↓ | 12.75V | 0 | 1 | 1 | 1 | 1 |
| 2 Verify Code Data | 0 | 1 | 5.0V | 0 | 0 | 0 | 1 | 1 |
| 3 Program Encryption | 0 | Pulse ↓ | 12.75V | 1 | 1 | 1 | 0 | 1 |
| 4 Read Signature Byte | 0 | 1 | 5.0V | 0 | 0 | 0 | 0 | 0 |
| 5 Program Lock Bits   Bit 1 | 0 | Pulse ↓ | 12.75V | | | Bit Address | | |
|   Bit 2 | 0 | Pulse ↓ | 12.75V | | | Bit Address | | |
|   Bit 3 | 0 | Pulse ↓ | 12.75V | | | Bit Address | | |

Mode 1 is used to write data to the EPROM or the EEPROM. The data that is presented on the PDATA will be programmed into the address that is presented on the PADDR and the pulsing of the program bit (PROG#) actually does the programming. Mode 2 presents the contents of the programmed byte for verification of a valid write. In other words, the second mode is used to verify that what was written during mode 1 is actually in the EPROM or EEPROM. For security purposes, mode 3 enables programing an encryption bit found on many microcontrollers, and this bit will encrypt all data that is read out of the EPROM or EEPROM. Mode 4 is used to read the microcontroller's signature byte, which enables the programmer to verify the type of microcontroller used in order to properly program the EPROM or EEPROM (e.g. the programmer needs to identify the microcontroller in order to know the size of the EPROM or EEPROM and to know the widths of the pulses it needs to use). Mode 5 is used to disable certain features of the microcontroller such as restricting dumping of the internal EPROM or EEPROM. In other words, the program lock bits lock various addresses, in order to prevent any further programming of the EPROM or EEPROM.

The Point Of Sale (POS) programming equipment will be the same for all radios. A six pin interface will be provided at a suitable access point on the end product. The interface consists of the following signals, taken from the full interface: RTX, RRX, PSEN#, DVCC, VPP and DGND. PSEN# is used to enable programming of the EPROM or EEPROM, in both serial and parallel programming versions. This signal is always driven low in the POS programmer, while not being connected in the modem processor system. In addition, it must have a suitable pull-up (typically 10KΩ) on the radio side of the interface. VPP is the programming voltage supply which typically has a value of 12.75 V. In the modem processor system, this is connected to digital VCC.

i. Test link

Bus interface 412 of FIG. 4 also has a test link, which includes six TESTA lines (TESTA0 to TESTA5) 526 and six TESTB lines (TESTB0 to TESTB5) 528. On the modem side, all test lines are shorted. However, on the radio transceiver side, these TEST lines allow certain points in the radio to be observed in a test environment at production. For example, at production, these TEST lines can be used to test the power amplifier, by breaking the input and output to the power amplifier and routing these two breaks to the TESTA and TESTB lines. In other words, the TEST lines provide a means for isolating a piece of circuitry in the radio transceiver for test purposes.

j. AC/DC specifications

For one embodiment of bus interface 412 of FIG. 4, Table 6 sets forth the electrical specifications for the signals that are transmitted on the transmitting and receiving signal link, the primary processor communication link, the secondary processor communication link, the half-duplex control link, the power supply link, and the radio insertion link. The maximum values specified should be adhered to in order to avoid clipping of the signals.

TABLE 6

| Signal | Source | Parameter | Min. | Type. | Max. | Notes |
|---|---|---|---|---|---|---|
| Power Supply Signals | | | | | | |
| TXVCC | Power Source | Voltage Range, $Icc=.2$ to $1.12$, | 6V | 7.2V | 8.5V | Direct battery voltage. |
|  |  | Ripple Voltage |  |  | 10mV | DC to 100MHz. |
| TRVCC | Power Source | Voltage Range, $Icc_{max}=100mA$, | 6V | 7.2V | 8.5V | Direct battery voltage. |
|  |  | Ripple Voltage |  |  | 10mV | DC to 100MHz. |
| RVCC | Power Source | Voltage Range, $Icc_{max}=200mA$, | 4.75V | 5V | 5.25V | Switched Power |
|  |  | Ripple Voltage |  |  | 1V | DC to 100MHz |
| DVCC | Power Source | Voltage Range, $Icc_{max}=50mA$ | 4.75V | 5V | 5.25V |  |
|  |  | Maximum $|RVCC - DVCC|$, (to minimize any cross-talk between the two supplies) |  |  | 0.25V | Both supplies active |
| RGND, DGND | Power Source | Maximum noise, DC to 100MHz |  |  | 1mV | Measured to any other ground point |
| Digital Signals | | | | | | |
| TXDIS# | Radio | Low level voltage, $I_{sink} = 1mA$ |  |  | 0.4V | 7.5KΩ pull up. Open drain signal |
| TXREADY RTX, & RINT | Radio | High level voltage, $I_{source}= 1 mA$. | 4V |  |  |  |
|  |  | Low level voltage, $I_{sink} = 1mA$ |  |  | 0.4V |  |
| TX_RX#, & RRX. | Modem | High level voltage, $I_{source}= 50\mu A$ | 4V |  |  |  |
|  |  | Low level voltage, $I_{sink} = 1mA$ |  |  | 0.4V |  |
| RESET | Modem | High level voltage, $I_{source}= 1 mA$. | 4V |  |  |  |
|  |  | Low level voltage, $I_{sink} = 1mA$ |  |  | 0.4V |  |
| RMD#1, & RMD#2 | Radio | Low level voltage, $I_{sink} = 10\mu A$. |  |  | 0.1V | Grounded signals in radio |
| RCLK | Radio | High level voltage, $I_{source}= 1 mA$. | 4V |  |  |  |
|  |  | Low level voltage, $I_{sink} = 1mA$ |  |  | 0.4V |  |
| Analog Signals (maximum ratings, see individual radio specifications for actual levels) | | | | | | |
| TXa_R, TXb_R | Modem | Maximum Diff O/P rms voltage, |  |  | 1.4V | Input imped 10KΩ. |
|  |  | Differential peak-peak volt., | 3.6V | 4.0V | 4.4V |  |
|  |  | Max frequency |  |  | 10KHz | 3dB point |

TABLE 6-continued

| Signal | Source | Parameter | Min. | Type. | Max. | Notes |
|---|---|---|---|---|---|---|
| RX_R | Radio | response<br>Demod. peak-peak voltage, | | | 2.5V | |
| | | Max frequency response | 300 | | 10KHz | 3dB point |
| | | Output impedance | | 100Ω | | |
| RSSI | Radio | Maximum voltage, | | | DVCC | |
| | | Max frequency response | DC | | 3KHz | 3 dB point |

The present invention has been described in conjunction with the above mentioned embodiments. However, it should be evident that numerous alternatives, modifications, variations and uses will be apparent those skilled in the art in light of the foregoing description.

What is claimed is:

1. A bus interface having a plurality of interconnects coupling a computer system to a radio transceiver and thereby enabling the computer system to control transmission and reception of signals by the radio transceiver, wherein the computer system has a processor, and the radio transceiver has a microcontroller coupled to a duplexor, the plurality of interconnects comprising:

a) a transmission and reception interconnect supplying transmit signals from the computer system to the radio transceiver and supplying receive signals from the radio transceiver to the computer system, b) a primary processor communication interconnect used by the processor and the microcontroller as the primary means for communication between the processor and the microcontroller, c) a secondary processor communication interconnect used by the processor for sending and receiving urgent communication signals to and from the microcontroller, d) a received signal strength indicator interconnect used by the radio transceiver to send an analog strength signal specifying the strength of an incoming received signal to the computer system, and e) a power supply link used to supply power signals to the radio transceiver.

2. The bus interface of claim 1, wherein the duplexor of the radio transceiver is a half-duplexor, said bus interface further comprising a half-duplex control interconnect used by the computer system to control the half-duplexor.

3. The bus interface of claim 2, wherein the half-duplex control interconnect comprises:

a) a transmit/receive bus line coupling the processor and the microcontroller, wherein
   1) the processor, to instruct the microcontroller to force the half-duplexor to be in a transmit mode, causes a transmit/receive signal on the transmit/receive bus line to transition to a first logic state, and
   2) the processor, to instruct the microcontroller to force the half-duplexor to be in a receive mode, causes the transmit/receive signal to transition to a second logic state, and b) a radio clock bus line carrying a radio generated clock signal from the radio transceiver to the processor.

4. The bus interface of claim 1, wherein the transmission and reception link comprises a multiplexing circuitry that provides the computer system with the option of using one of a plurality of communication devices, wherein a first communication device is the radio transceiver.

5. The bus interface of claim 1, wherein the primary processor communication link is a full-duplex serial port comprising:

a) a radio receive bus line used by the processor to send communication signals to the microcontroller, and b) a radio transmit bus line used by the microcontroller to send communication signals to the processor.

6. The bus interface of claim 5, a) wherein the primary processor communication link is an asynchronous full-duplex serial port, and the communication signals relayed on the serial port have an eight data bits, one stop bit, and no parity bit data configuration, b) wherein the communication signals transmitted on the radio receive bus line by the processor have a Command byte, n-byte data field, a first fixed value byte, a second fixed value byte command structure, and c) wherein the communication signals transmitted on the radio transmit bus line by the microcontroller have
   1) an Acknowledge byte command structure when the communication signals transmitted on the radio receive bus line by the processor do not require the microcontroller to send data back to the processor,
   2) a Response byte, n-byte data field, the first fixed value byte, the second fixed value byte command structure when the communication signals transmitted on the radio receive bus line by the processor do require the microcontroller to send data back to the processor, and
   3) a Not acknowledge byte command structure when the microcontroller needs the processor to resend to the microcontroller the communication signals transmitted on the radio receive bus line.

7. The bus interface of claim 1, wherein the secondary processor communication link, for relaying urgent communication signals between the processor and the microcontroller, comprises a) a transmit disable bus line operably coupled to a switch controlling a power supply of the radio transceiver, wherein the processor and the microcontroller can switch off the power to the radio transceiver by causing a transmit disable signal on the transmit disable line to transition to a first logic state, b) a transmit ready bus line used by the microcontroller to inform the processor that the radio transceiver is ready to receive transmission signals, wherein the microcontroller causes a transmit ready signal on the transmit ready bus line to transition to a second logic state when the radio transceiver is ready to receive transmission signals, and causes the transmit ready signal to transition to a third logic state when the radio transceiver is not ready to receive transmission signals, c) a reset bus line used by the processor to reset the microcontroller to a previously determined state by causing a reset signal on the rest bus line to transition to a fourth logic state, and d) radio interrupt bus line used by the microcontroller to send an interrupt signal to the processor.

8. The bus interface of claim 1, wherein the power supply link comprises a first digital supply voltage line and a second digital supply voltage line, wherein both of the digital supply voltage lines are coupled to the processor and the microcontroller.

9. The bus interface of claim 1 further comprising a radio insertion interconnect used by the processor to detect when a plug-in radio transceiver is correctly coupled to the computer system through the bus interface.

10. The bus interface of claim 1 further comprising a test interconnect used to test predetermined elements of the radio transceiver during production of the radio transceiver.

\* \* \* \* \*

UNITED STATES PATENT AND TRADEMARK OFFICE
CERTIFICATE OF CORRECTION

PATENT NO.   :   5,511,069
DATED        :   April 23, 1996
INVENTOR(S)  :   England et al.

It is certified that error appears in the above-identified patent and that said Letters Patent is hereby corrected as shown below:

In column 7, at line 38 (in Table 2), delete "10bdBw" and substitute -- -10dBw --.

In column 9, in the last line of Table 4, delete "recruired" and substitute --required--.

Signed and Sealed this

Fourteenth Day of January, 1997

*Attest:*

BRUCE LEHMAN

*Attesting Officer*    Commissioner of Patents and Trademarks